United States Patent [19]

Fischer et al.

[11] Patent Number: 4,594,714
[45] Date of Patent: Jun. 10, 1986

[54] DUAL-ACTUATOR MONITOR

[75] Inventors: William C. Fischer, Monroe; David J. Verzella, Guilford; Stuart C. Wright, Milford, all of Conn.

[73] Assignee: United Technologies Corporation, Hartford, Conn.

[21] Appl. No.: 490,645

[22] Filed: May 2, 1983

[51] Int. Cl.⁴ .................. G05D 1/00; G06F 11/30
[52] U.S. Cl. .................................. 371/62; 364/434; 371/68; 244/194
[58] Field of Search ............ 369/424, 434, 551; 244/194; 318/565; 371/16, 25, 62, 68

[56] References Cited

U.S. PATENT DOCUMENTS

| | | | |
|---|---|---|---|
| 4,043,526 | 8/1977 | Donley et al. | 244/194 |
| 4,095,763 | 6/1978 | Builta | 318/565 |
| 4,130,241 | 12/1978 | Meredith et al. | 371/68 |
| 4,209,734 | 6/1980 | Osder | 318/565 |
| 4,460,964 | 7/1984 | Skutecki et al. | 364/434 |
| 4,472,806 | 9/1984 | Blair | 371/68 |

Primary Examiner—Felix D. Gruber
Attorney, Agent, or Firm—Gerald E. Linden

[57] ABSTRACT

In a dual actuator system, runaways are identified by comparing the position and rate of one actuator to another. When there is a threshold position discrepancy and a sustained rate discrepancy, a fault is indicated. The faster actuator is identified as the runaway.

2 Claims, 1 Drawing Figure

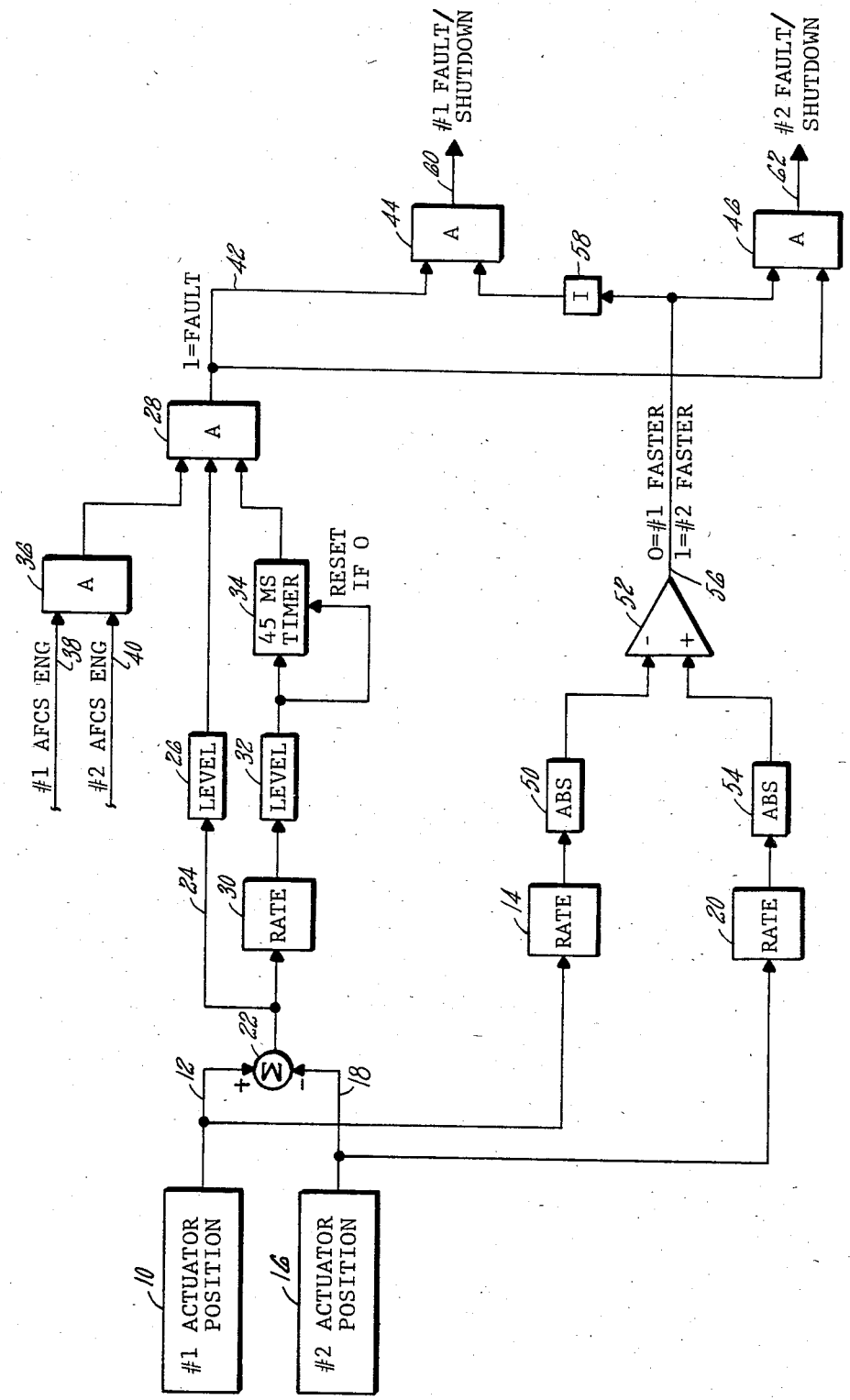

DUAL-ACTUATOR MONITOR

TECHNICAL FIELD

This invention relates to detecting differences between a plurality of signals, and more particularly, to monitoring the activity of dual inner-loop actuators in aircraft Automatic Flight Control Systems.

BACKGROUND ART

Many control/positioning systems use actuators to position mechanisms, such as the control surfaces of an aircraft. These actuators may be electromechanical, electrohydraulic, etc. A typical aircraft Automatic Flight Control System (AFCS) includes a dual independent stability augmentation system (SAS) to provide automatic fail-operational capability. Dual systems are usually configured to identify a discrepancy between the actuators. If the system is allowed to continue operating in the event of an actuator run-away, the pilot or copilot may take the required corrective action. While such a system is satisfactory in a dual-pilot aircraft, its use in a single pilot aircraft would be unacceptable. It is known to shut down both actuators in a dual-actuator system to remedy a run-away. However, shutting down both actuators in the event of a failure of one is undesirable since it leaves the pilot without that particular loop of autopilot control. Presently, available systems which will shut down the particular run-away actuator require an arbitrator, either a third actuator or an electronic model, to achieve the shut down and as such are quite complex.

Each actuator in a dual system has separate sensors and electronics. Therefore, while each should respond similarly, some discrepancy is to be expected. Typically, the discrepancy is on the order of only a few percent. These small discrepancies are acceptable, since one actuator generally tends to compensate for discrepancies in the other. Therefore, the position of one actuator may lag the position of its companion, but large positional discrepancies serve as nominal indicators of an actuator failure. Consider however the case where the actuators are at 70% of their travel (authority) and one actuator (or its associated electronics) fails and goes hardover to 0%. The other actuator is left with only 30% authority with which to counteract the hardover and therefore will be unable to compensate fully. In certain control axes, such as pitch, such a failure can be very undesirable.

DISCLOSURE OF INVENTION

Therefore it is an object of this invention to monitor and shut-down an inner-loop actuator quickly when there is a failure that causes a runaway actuator. It is a further object of this invention to identify which actuator has failed without an arbitrator.

According to the invention, the position and rate of an actuator is sensed and compared to the position and rate of a companion actuator. When there is a threshold discrepancy in actuator positions and a sustained rate discrepancy, a fault is indicated. The faster actuator is identified as the runaway. Some discrepancy in position and rate is to be expected during normal operation. Therefore, the position discrepancy threshold and requirement for a sustained rate discrepancy reduce nuisance failures.

The invention may be implemented utilizing analog, digital or computer signal processing, employing only apparatus and techniques which are well within the skill of the art in the light of the teachings which follow hereinafter with respect thereto. The foregoing and other objects, features and advantages of the present invention will become more apparent in the light of the following detailed description of an exemplary dedicated hardware embodiment thereof.

BRIEF DESCRIPTION OF DRAWINGS

The sole FIGURE is a simplified schematic block diagram of the dual-actuator monitor of this invention for inner-loop (SAS) control.

BEST MODE FOR CARRYING OUT THE INVENTION

In the sole FIGURE is shown a dual-actuator monitor for association with a dual channel actuator system, such as the dual inner-loop pitch channel that has been disclosed in commonly owned, copending U.S. Pat. No. 4,387,432 entitled "Pulsed Aircraft Actuator", which is herein incorporated by reference. Cross-references to said U.S. patent application are made hereinafter in the following abbreviated format: (P.A.A., FIG. n: reference number xy).

A position sensor 10 provides a first position signal on a line 12 indicative of the position of a first inner-loop actuator (P.A.A., FIG. 1:24). Similarly a position sensor 16 (P.A.A., FIG. 1:25) provides a second position signal on a line 18. It should be understood that the particular position sensor used may be one that is used in the actuator trim feedback, loop, or may be a separate position monitoring sensor such as a potentiometer.

A summer 22 provides a signal on a line 24 indicative of the difference of the first position signal and the second position signal. A comparator such as a level detector 26, provides a position discrepancy signal (logic ONE) to an AND circuit 28 when the signal on the line 24 exceeds a threshold, such as 10% of full actuator authority as a first step towards fault indication. Some degree of positional discrepancy is acceptable in a normally functioning system, as discussed hereinbefore.

A derived rate circuit 30 responds to a changing signal on the line 24 and provides a rate difference signal to a level detector 32 which, in turn, provides a signal to a timer 34 when the rate difference signal exceeds a threshold. Passive, or slower than threshold rate, runaways are not of concern as they allow time for pilot intervention. The timer 34 provides a rate discrepancy signal to the AND circuit 28, further indicative of a fault, when the rate difference in excess of the threshold is sustained for more than a reference time, interval, such as forty-five milliseconds. The timer 34 resets when the output of the level detector 32 is ZERO, indicative of a rate discrepancy below the threshold. Under normal operating conditions a large rate discrepancy is permissible if it is not sustained since neither the effect of the runaway nor the corrective response of the other actuator is significant if sustained for less than forty-five milliseconds. Clearly, if one actuator reaches its stop before the other, a high rate difference will temporarily be established. It should be understood that the rate difference could be established directly by comparing individual actuator rates rather than indirectly in response to the changing disparity in actuator positions.

The dual-actuator monitor is not enabled if the system is operating on only one channel since the position and rate date discrepancies would be great. Therefore, an AND circuit 36 is responsive to signals on lines 38, 40 indicative of the two channels being engaged, and provides a signal to the AND circuit 28 to enable the monitor when both loops are engaged.

When all of the inputs to the AND circuit 28 are high the system is enabled and a signal is provided on a line 42 to an AND circuit 44 and an AND circuit 46 as an indication that there is a fault. Next it is determined which actuator has failed.

A derived rate circuit 14 provides a signal indicative of the first actuator rate in response to a changing position signal on the line 12. Similarly, a derived rate circuit 20 provides a signal indicative of the second actuator rate. The absolute value of the first actuator rate is provided by an absolute circuit 50 to the inverting input of a high gain, hard-limited amplifier, such as the low input of an Operational Amplifier 52. Similarly, an absolute circuit 54 provides the absolute value of the second actuator rate to the non-inverting input of the Amplifier 52. When the first actuator rate is greater than the second actuator rate, the output of the Op Amp 52 is logic ZERO and is complimented by an inverter 58 to provide a signal to the AND circuit 44 which, in conjunction with the signal on the line 42, will provide a signal on a line 60 to indicate a number one actuator fault. Similarly, when the second actuator rate exceeds the first actuator rate, the output of the Op Amp 52 on the line 56 is logic ONE and is provided to the AND circuit 46 where, in conjunction with the signal on the line 42, a signal is provided on a line 62 to indicate a number two actuator fault.

Thus, it is easily seen how a fault is determined based on coextensive positional and rate discrepancies and how the faster actuator is identified as the faulty one.

The foregoing description is principally in terms of function achieving blocks, and it should be understood that numerous variations may be utilized for achieving the same or equivalent functions in combinations of functions within the skill of the art. For instance, the positive logic disclosed may readily be reworked into inverting logic.

Specific applications or actuator characteristics may dictate different thresholds or lags or may permit elimination of some nuisance avoidance features. It should be understood that the dual actuator monitor of this invention could be implemented with one actuator and an independent model or with multiple actuators.

In addition, the functions of the foregoing apparatus monitor may readily be implemented in a suitably programmed digital computer. The conversion of the discrete and analog functions described herein to digital functions performed by suitable software in a computer is well within the skill of the art, particularly in the light of the teachings of equivalency set forth in a commonly owned co-pending U.S. Pat. No. 4,382,283 filed on Aug. 8, 1980 by Clelford et al.

Aspects of the invention may be practiced in automatic control of various functions, in addition to the illustrative functions described herein.

Similarly, although the invention has been shown and described with respect to an exemplary embodiment thereof, it should be understood by those skilled in the art that the foregoing and various other changes, omissions and additions may be made therein and thereto, without the departing from the spirit and scope of the invention.

What is claimed is:

1. A dual actuator monitor for use with a positioning system that has a first actuator and a second actuator for positioning a mechanism, that comprises:

a first position sensor for providing a first position signal indicative of the position of the first actuator;

a second position sensor for providing a second position signal indicative of the position of the second actuator; and signal processing means, connected for response to the first position sensor and the second position sensor, for providing a first rate signal indicative of the absolute rate of the first actuator, for providing a second rate signal indicative of the absolute rate of the second actuator, for providing a position discrepancy signal when the difference in actuator position indicated by the first position signal and the second position signal exceeds a threshold, for providing a rate discrepancy signal in response to the first position signal and the second position signal indicating a relative change in positions between the first actuator and the second actuator in excess of a threshold that is sustained for more than a reference time interval, and for providing a fault signal when the position discrepancy signal and the rate discrepancy signal are both present.

2. A dual actuator monitor for use with a positioning system that has a first actuator and a second actuator for positioning a mechanism, that comprises:

a first position sensor for providing a first position signal indicative of the position of the first actuator;

a second position sensor for providing a second position signal indicative of the position of the second actuator; and signal processing means, connected for response to the first position sensor and the second position sensor, for providing a first rate signal indicative of the absolute rate of the first actuator, for providing a second rate signal indicative of the absolute rate of the second actuator, for providing a position discrepancy signal when the difference in actuator position indicated by the first position signal and the second position signal exceeds a threshold, for providing a rate discrepancy signal in response to the first position signal and the second position signal indicating a relative change in positions between the first actuator and the second actuator in excess of a threshold that is sustained for more than a reference time interval, for indicating a first actuator fault when the position discrepancy signal and the rate discrepancy signal are present and the first rate signal is greater than the second rate signal, and for indicating a second actuator fault when the position discrepancy signal and the rate discrepancy signal are present and the second rate signal is greater than the first rate signal.

* * * * *